United States Patent
Golden et al.

(10) Patent No.: US 6,568,894 B2
(45) Date of Patent: May 27, 2003

(54) FASTENER DEVICES, SUCH AS LOCK-PINS

(75) Inventors: Richard Golden, Bainbridge Island, WA (US); Mark Adams, Bainbridge Island, WA (US)

(73) Assignee: Golden Dove Marine, Bainbridge Island, WA (US)

( * ) Notice: Subject to any disclaimer, the term of this patent is extended or adjusted under 35 U.S.C. 154(b) by 0 days.

(21) Appl. No.: 09/970,081

(22) Filed: Oct. 2, 2001

(65) Prior Publication Data

US 2002/0069681 A1 Jun. 13, 2002

Related U.S. Application Data

(60) Provisional application No. 60/237,875, filed on Oct. 4, 2000.

(51) Int. Cl.[7] .................................................. F16B 21/00
(52) U.S. Cl. ........................ 411/351; 411/349; 411/513; 411/552
(58) Field of Search ................................. 411/351, 356, 411/357, 513, 514, 340, 343, 344, 345, 347, 349, 552; 403/153, 154, 155, 378, 379

(56) References Cited

U.S. PATENT DOCUMENTS

| | | | |
|---|---|---|---|
| 1,799,934 A | | 4/1931 | Strid |
| 2,399,119 A | | 4/1946 | Howell |
| 3,747,168 A | * | 7/1973 | Snarskis ..................... 411/349 |
| 4,102,124 A | | 7/1978 | Swager |
| 4,205,586 A | | 6/1980 | MacNeill |
| 4,789,287 A | * | 12/1988 | Le ............................. 411/107 |
| 4,801,232 A | * | 1/1989 | Hempel ..................... 411/552 |
| 4,822,197 A | | 4/1989 | DeMartino et al. |
| 5,112,155 A | | 5/1992 | Jackson |
| 5,114,260 A | | 5/1992 | Hart et al. |
| 5,199,733 A | | 4/1993 | DeLorme |
| 5,437,515 A | | 8/1995 | Kuramoto et al. |
| 5,460,418 A | | 10/1995 | Falls |
| 5,599,150 A | | 2/1997 | Edwards et al. |
| 5,607,271 A | * | 3/1997 | Salice ........................ 411/349 |
| 5,845,898 A | | 12/1998 | Halder et al. |
| 6,023,927 A | | 2/2000 | Epstein |

* cited by examiner

*Primary Examiner*—Flemming Saether
*Assistant Examiner*—Jori Schiffman
(74) *Attorney, Agent, or Firm*—Perkins Coie LLP

(57) ABSTRACT

Fasteners, such as lock-pins, that in selected embodiments can be installed or removed from the near side of a blind installation. In one embodiment, the lock-pin includes a pin and a rotatable key. The pin includes a head portion, a shaft portion having a tip end, and a longitudinal axis of symmetry. A bore extends through the head portion and the shaft portion in a generally longitudinal direction non-colinear with the longitudinal axis of symmetry. In one aspect of this embodiment, the key includes a spring portion toward the head portion of the pin, a retainer portion toward the tip end of the pin, and an actuator rod portion extending therebetween rotatably disposed within the bore of the pin. When the key is rotated to an unlocked position, the retainer portion is disposed within the diameter of the shaft portion such that the pin can be inserted in, or retracted from, a hole only slightly larger in diameter than the shaft portion. When the key is rotated to a locked position, the retainer portion is extended outboard of the shaft portion thereby retaining the lock-pin in the hole.

39 Claims, 8 Drawing Sheets

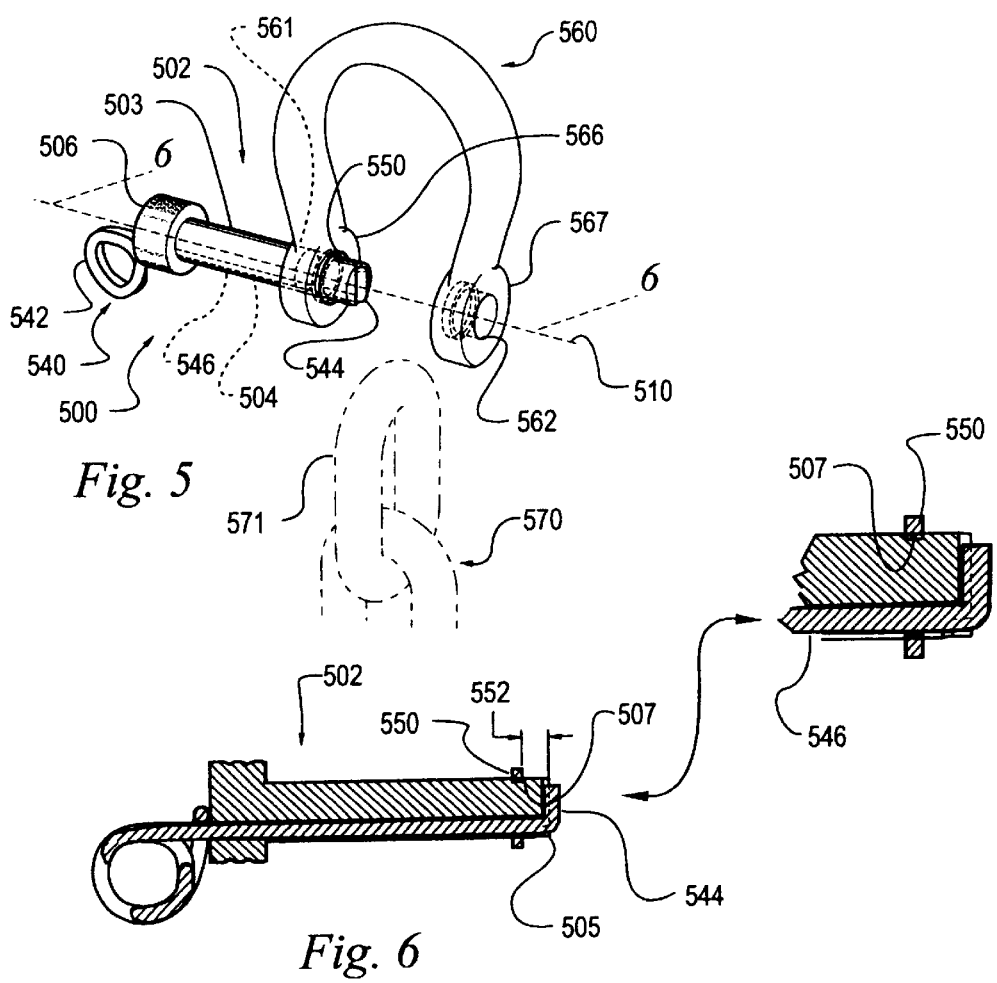
Fig. 5
Fig. 6
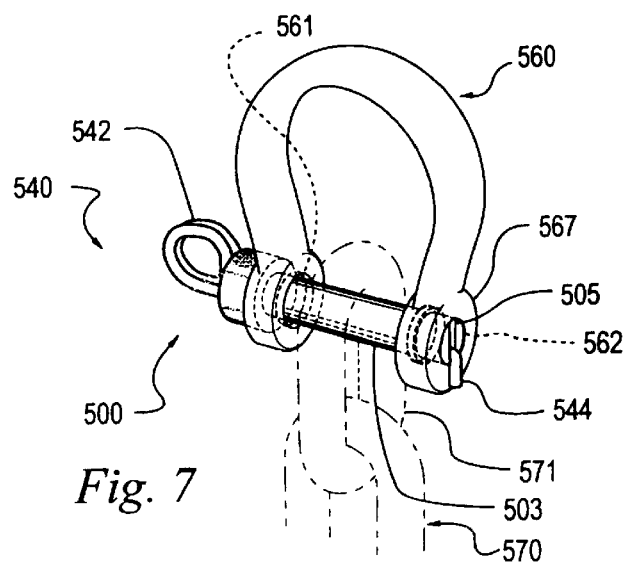
Fig. 7

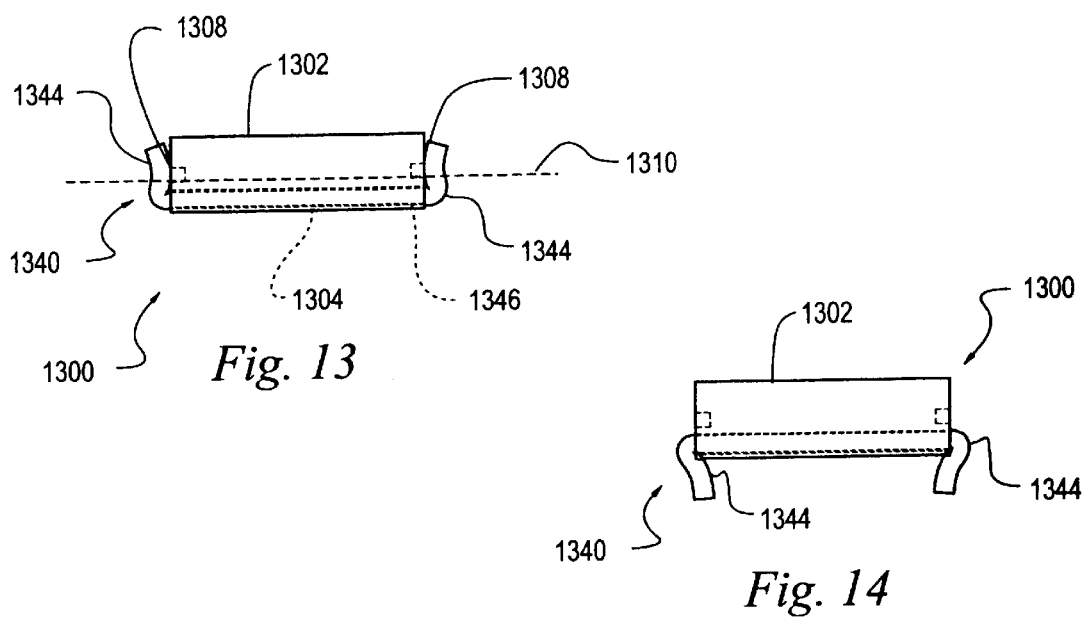
Fig. 13
Fig. 14
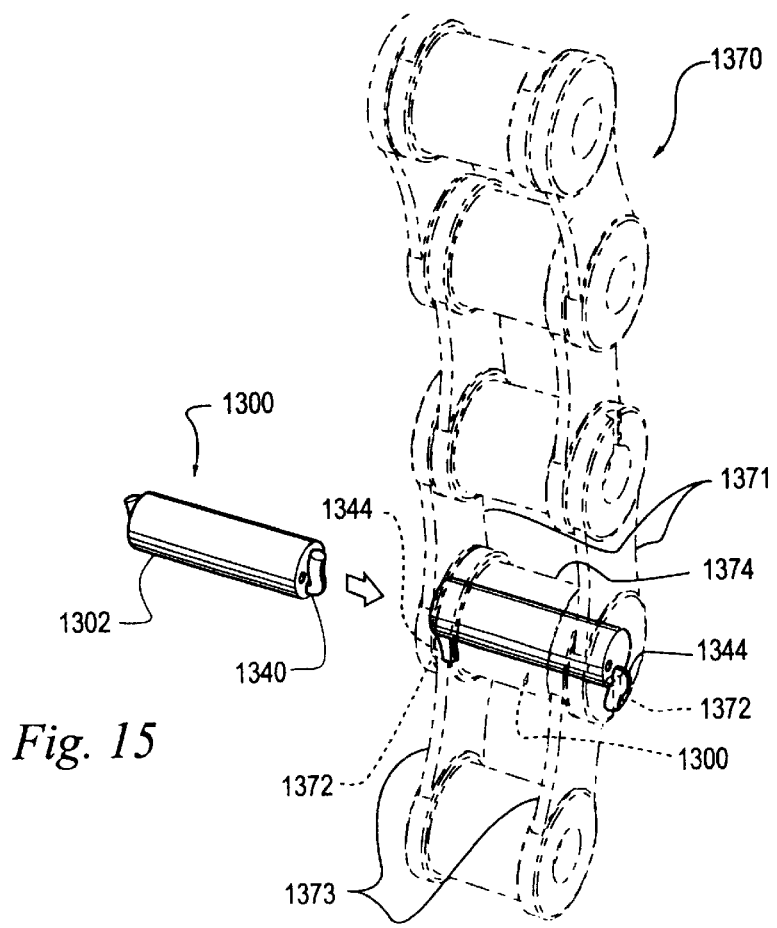
Fig. 15

FASTENER DEVICES, SUCH AS LOCK-PINS

RELATED APPLICATIONS

This application claims the benefit of U.S. Provisional Patent Application No. 60/237,875, filed on Oct. 4, 2000 and incorporated herein by reference.

TECHNICAL FIELD

The present invention is directed generally to fasteners for joining two or more structures together and, more particularly, to lock-pins, such as lock-pins that are installable and removable from a single side of a joint or other installation.

BACKGROUND

There are many ways that lock-pins and similar devices can be used to join two or more structures together at a common joint. Lock-pins for this purpose generally have a head of some type toward a head end, a locking element of some type toward an opposite tip end, and a cylindrical shaft therebetween. Such lock-pins are typically installed by inserting the tip end through a hole on the "near-side" of a joint until it emerges on the "far-side" of the joint. The locking element is then installed or otherwise implemented toward the tip end to retain the lock-pin in the joint, thereby making a structural connection.

FIGS. 1A through 1D collectively are side views of some common lock-pins in accordance with the prior art. FIG. 1A, for example, illustrates a lock-pin 100 having a head 101 and a cylindrical shaft 102. A bore 103 extends perpendicularly through the tip end of the shaft 102 and can removably receive a cofter pin 104 or a similar device as a separate locking element. Lock-pin devices similar to the lock-pin 100 can be used for myriad applications, including shackle-type installations. U.S. Pat. Nos. 5,114,260 to Hart et al., 5,460,418 to Falls, 4,102,124 to Swager, and 6,023,927 to Epstein disclose but a few such lock-pin devices.

Other lock-pins are similar to the lock-pin 100, except they do not use a cotter pin type locking element. U.S. Pat. No. 1,799,934 to Strid, for example, discloses a lock-pin that uses a continuous wire spring resiliently inserted through the bore 103 as a locking element that retains the pin once installed. U.S. Pat. No. 2,399,119 to Howell, U.S. Pat. No. 4,205,586 to MacNeill, and U.S. Pat. No. 5,599,150 to Edwards et al., all embody designs similar to Strid. One advantage of these lock-pins over the lock-pin 100 is that their locking elements can be installed, removed, and reinstalled through the bore 103 more easily than the cotter pin 104.

In many applications, it will be desirable to install a lock-pin through a hole where no access exists to the far-side of the hole where the tip of the lock-pin emerges. For ease of reference, such an installation will be referred to throughout this disclosure as a "blind" installation. A common feature of all the prior art lock-pins discussed above is that they require access to the tip end of the shaft 102 after the shaft has been inserted through a hole so that a separate locking element can be installed in the bore 103. This feature renders these lock pins essentially useless in blind applications. Another common shortcoming associated with all these lock-pins is that the separate locking element, whether it be a cotter pin or a wire spring, can easily be lost or misplaced, thereby frustrating installation and again rendering the lock-pin essentially useless.

FIG. 1B is a side view of a lock-pin 110 in accordance with the prior art that does not use a separate locking element. The lock-pin 110 has pull-ring 111 moveably attached toward the head end of a cylindrical shaft 112. A rotatable locking element 114 is rotatably attached toward the tip end of the shaft 112, and a coil spring 115 is coaxially disposed over the shaft in compression against the locking element. The locking element 114 is rotated to an unlocked position in axial alignment with the shaft 112 for installation of the lock-pin 110 through a hole (not shown). After installation, the locking element 114 is rotated approximately 90 degrees to a locked position as illustrated to prevent the lock-pin 110 from backing out of the hole. The coil spring 115 keeps the locking element 114 in this locked position unless or until the locking element is manually rotated to the unlocked position.

U.S. Pat. No. 5,437,515 to Kuramoto et al. discloses a lock-pin that is similar to the lock-pin 110 shown in FIG. 1B. In Kuramoto, however, the locking element is maintained in the locked position by way of a positioning member inserted radially through the locking element. U.S. Pat. No. 5,112,155 to Jackson and U.S. Pat. No. 4,822,197 to DeMartino et al. have locking mechanisms similar to that disclosed in Kuramoto, but they do not require a positioning member. Although lock-pins like that shown in FIG. 1B do not require a separate locking element as does the lock-pin shown in FIG. 1A, they nevertheless still cannot be used as a removable fastener in blind installations where there is no access to the tip end of the shaft 112 to rotate the locking element 114 as necessary to retain or remove the lock-pin.

FIGS. 1C and 1D illustrate some prior art lock-pins that can be installed from only one side of an installation application and thus are useable in blind applications. Shown in FIG. 1C, for example, is a quick-release pin 120 that can be installed with access to only the near-side of a joint. The quick-release pin 120 is similar, but not identical, to the lock-pin disclosed in U.S. Pat. No. 5,845,898 to Halder et al. The quick-release pin 120 consists of a spring-loaded plunger 125 that movably extends longitudinally through the center of a cylindrical shaft 122 from a head end toward a tip end. By pressing the spring-loaded plunger 125, two balls 124 located at the tip end of the shaft 122 are allowed to retract radially inward until flush with the outer surface of the shaft, thereby allowing the quick-release pin 120 to be inserted through a hole (not shown). When the spring-loaded plunger 125 is released, it pushes radially outward against the two balls 124 causing the balls to protrude radially outward and act as locking elements that retain the lock-pin 120 in the hole.

One shortcoming of the quick-release pin 120 of FIG. 1C is that manufacturing considerations prevent the balls 124 from protruding very far outboard of the shaft 122. As a result, the quick-release pin 120 cannot hold two structures together effectively unless the shaft 122 is a very close fit in the corresponding hole through which the quick-release pin is inserted. Hole tolerances often cannot be held close enough to make this type of lock-pin useful or cost effective. In addition, the ball-type locking elements of this type of lock-pin are prone to release prematurely where vibration or substantial axial loads are present. Furthermore, the complicated assembly of the quick-release pin 120, in addition to its plurality of elements, can make it expensive to manufacture and hence costly to the consumer.

FIG. 1D is a side view of yet another lock-pin 130 in accordance with the prior art that can be used in blind applications. The lock-pin 130 has a pull-ring 131 moveably attached toward a head end of a cylindrical shaft 132, and a single spring-loaded ball 134 located toward a tip end of the shaft. The lock-pin 130 is intended to be installed by simply pressing it into a hole with sufficient force to overcome the spring-loaded ball 134 causing it to retract into its hole. The lock-pin 130 is accordingly removed by pulling on the pull-ring 131 with a force of similar magnitude. As should be apparent to those of ordinary skill in the art, the lock-pin 130 is a poor choice for those applications that could be subjected to a substantial axial load in service, because of the tendency for such an axial load to overcome the spring-loaded ball 134 and disengage the lock pin.

In addition to the various prior art lock-pins discussed above, a safety hitch-type lock-pin having a shaft with a coaxial longitudinal bore is disclosed in U.S. Pat. No. 5,199,733 to DeLorme. In DeLorme, a lock-rod is inserted through the bore from the head end and is connected to two flanges embedded into respective slots toward the tip end. Rotation of the lock-rod causes the flanges to rotate outward, thus retaining the lock-pin after installation. This sophisticated mechanism consists of several moving parts, is relatively difficult to manufacture, and hence is relatively costly. In light of the shortcomings associated with prior art lock-pins as discussed above, a simple yet robust lock-pin, suitable for use in blind applications, would be desirable.

SUMMARY

The present invention overcomes limitations of the prior art by providing a lock-pin that, in selected embodiments, can be used in blind applications and still carry substantial axial loads. In one embodiment, the lock-pin comprises a pin having a first end spaced apart from a second end and a cylindrical shaft portion at least partially disposed between the first and second ends. The shaft portion defines a cross-section dimension and a longitudinal axis of symmetry. A bore extends through the shaft portion in a generally longitudinal direction non-collinear with the longitudinal axis of symmetry.

In one aspect of this embodiment, the lock-pin further comprises a rotatable key at least partially rotatably disposed within the bore. The rotatable key includes an actuating portion positionable toward the first end of the pin and a retainer portion positionable toward the second end of the pin. The rotatable key is optionally rotatably positionable to rotate the retainer portion to a first position entirely within the cross-section dimension of the shaft portion or to a second position at least partially outside of the cross-section dimension of the shaft portion.

In one embodiment of the invention, the lock-pin can join a first structure having a first hole to a second structure having a second hole. The first and second holes should have diameters at least slightly greater than the cross-section of the shaft portion of the pin, and the first hole should be axially aligned with the second hole. In one aspect of this embodiment, the rotatable key of the lock-pin is initially rotated so that the retainer portion is in the first position. The shaft portion of the pin is then inserted through the first and second holes. Subsequent rotation of the retainer portion to the second position captures the lock-pin in the first and second holes, thereby joining the first structure to the second structure.

BRIEF DESCRIPTION OF THE DRAWINGS

FIG. 5 is an isometric view of a lock-pin and a clevis in accordance with an embodiment of the invention useable for coupling a linkage, such as a chain shown in phantom, to the clevis.

FIG. 6 is a side cross-sectional view of the lock-pin of FIG. 5 taken substantially along line 6—6 of FIG. 5.

FIG. 7 is an isometric view of the components of FIG. 5 in which the lock pin is coupling the chain to the clevis in accordance with an embodiment of the invention.

FIG. 13 is a side view of a lock-pin having a rotatable key in accordance with yet another embodiment of the invention in which the rotatable key is rotated to an unlocked position.

FIG. 14 is a side view of the lock-pin of FIG. 13 in which the rotatable key is rotated to a locked position.

FIG. 15 is an isometric view showing the lock-pin of FIGS. 13 and 14 coupling a first link-set shown in phantom to a second link-set shown in phantom in accordance with an embodiment of the invention.

DETAILED DESCRIPTION

The present disclosure describes lock-pins that can be installed or removed from the near side of a joint or other installation without requiring access to the far side of the joint. In the following description, certain specific details are set forth in order to provide a thorough understanding of various embodiments of the invention. One of ordinary skill in the relevant art, however, will readily appreciate that the present invention may have additional embodiments, or that the invention may be practiced without several of the details described below. In other instances, well-known structures associated with lock-pins, such as the various head or shaft designs possible, have not been shown or described in detail to avoid unnecessarily obscuring the description of embodiments of the invention.

Figure 1A:
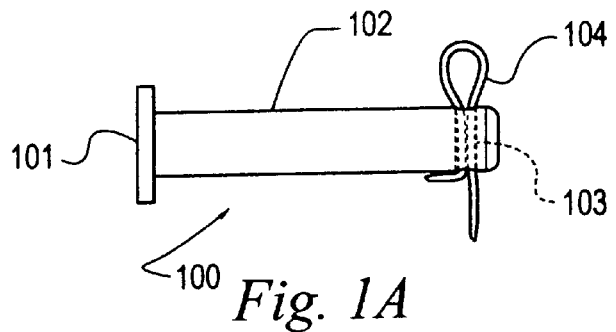
FIGS. 1A through 1D are side views of lock-pins in accordance with the prior art.
Figure 1B:
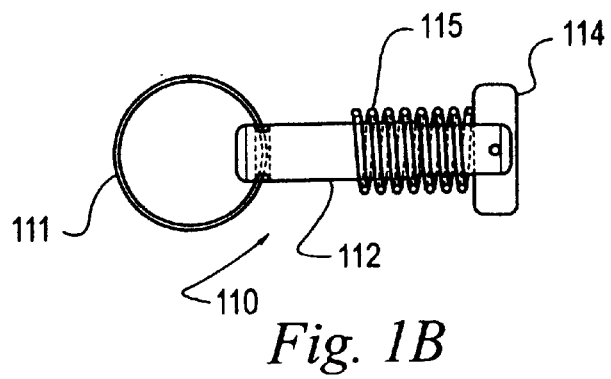
Figure 1C:
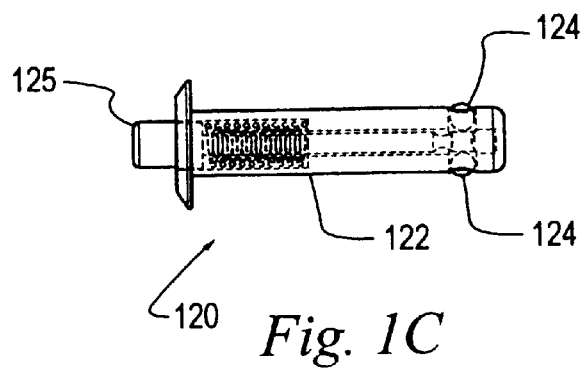
Figure 1D:
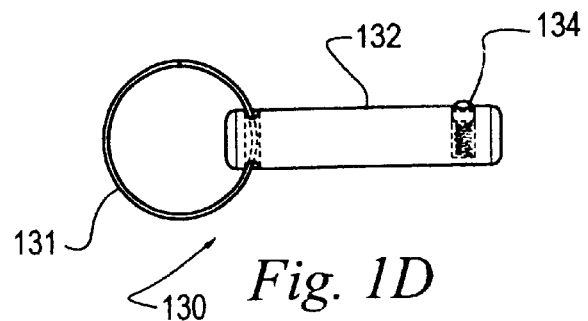
Figure 2:
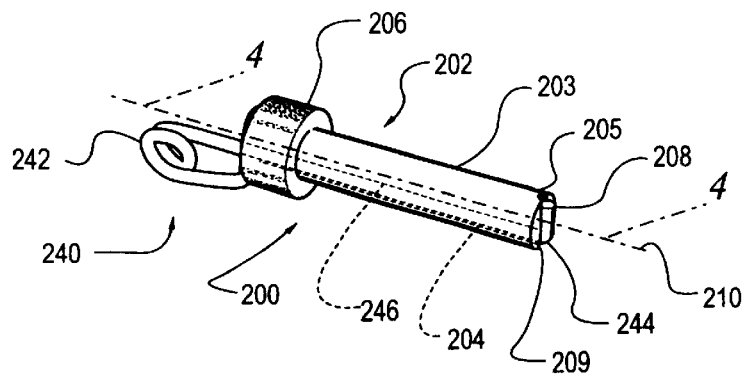
FIG. 2 is an isometric view of a lock-pin having a rotatable key in accordance with an embodiment of the invention in which the key is rotated to an unlocked position.
Figure 3:
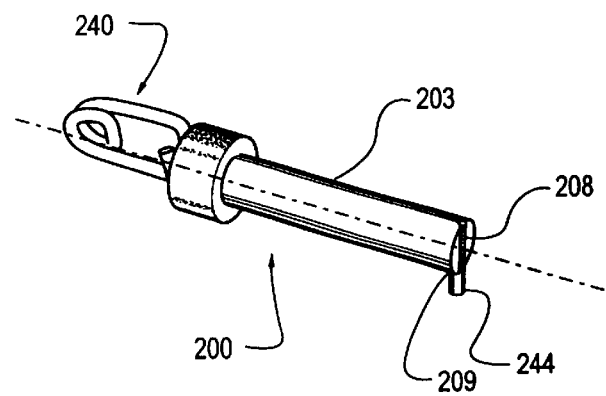
FIG. 3 is an isometric view of the lock-pin of FIG. 2 in which the rotatable key is rotated to a locked position.

FIGS. 2 and 3 are isometric views of a lock-pin 200 in a first, or unlocked configuration, and a second, or locked configuration, respectively, in accordance with an embodiment of the invention. In one aspect of this embodiment as best seen in FIG. 2, the lock-pin 200 includes a pin 202 and a rotatable key 240. The pin 202 includes a head portion 206, a shaft portion 203 with a tip end 205, and a longitudinal axis of symmetry 210. A straight bore 204 extends through the head portion 206 and the shaft portion 203 in a direction that is at least generally longitudinal. The bore 204, however, is not collinear with the longitudinal axis of symmetry 210. For example, in one embodiment, the bore 204 is parallel to, and offset from, the longitudinal axis of symmetry 210. In other embodiments, the bore 204 can be skewed relative to the longitudinal axis of symmetry, yet nevertheless still extend in a generally longitudinal direction.

A first groove 208 extends from the bore 204 across the tip end 205 in a first direction at a right angle to the bore. A second groove 209, that in one embodiment is shorter and deeper than the first groove 208, extends from the bore 204 across the tip end 205 in a second direction at a right angle to the bore. In one embodiment, the second direction is opposite to the first direction. In other embodiments, the second direction can be at other angles relative to the first direction. In another aspect of this embodiment, the key 240 includes an actuating portion, such as a spring portion 242, located toward the head portion 206, a retainer portion 244 located toward the tip end 205, and an actuator rod portion 246 extending therebetween rotatably disposed within the bore 204.

As best seen with reference to FIGS. 2 and 3 together, the lock-pin 200 is optionally positionable between the unlocked and locked configurations by rotating the key 240 with respect to the pin 202 to appropriately position the retainer portion 244. In one aspect of this embodiment, rotation of the key 240 may be facilitated by restraining the head portion 206 and depressing the spring portion 242 toward the head portion while rotating the key. For example, from the unlocked configuration as shown in FIG. 2, the key 240 is rotated at least approximately 180 degrees such that the retainer portion 244 moves out of the first groove 208 and is removably received in the second groove 209 protruding outboard of the shaft portion 203 at a substantially right angle, thereby preventing the shaft portion from being removed from a hole (not shown) shaped and sized to removably accept the shaft portion. Similarly, from the locked configuration as shown in FIG. 3, the key 240 is accordingly rotated at least approximately 180 degrees such that the retainer portion 244 moves out of the second groove 209 and is removably received in the first groove 208 stowed within a cross-section dimension, such as a diameter, of the shaft portion 203, thereby allowing the shaft portion to be inserted in, or removed from, the hole (not shown).

In one aspect of this embodiment, the head portion 206 is generally cylindrical in shape and can be knurled for ease of handling. In other embodiments, other head shapes can be used to best suit particular applications. For example, a hexagonal head shape can be used allowing a conventional wrench to be applied to the lock-pin 200. In another aspect of this embodiment, the shaft portion 203 is generally cylindrical and coaxially disposed with respect to the head portion 206. In other embodiments, the shaft portion 203 may have other cross-sectional shapes. For example, a generally square or hexagonal shape can be used as different applications may dictate. In another aspect of this embodiment, the pin 202 can be comprised of a suitable metallic material. For example, the pin can be comprised of a stainless steel material. In other embodiments, other metallic materials, such as carbon steel or aluminum can be used. In yet other embodiments, suitable non-metallic materials such as composites can be used. In yet another aspect of this embodiment, the key 240 can be comprised of a resilient metallic wire material. In one embodiment, the wire material can be 0.030 gauge piano wire. In other embodiments, other wire materials, such as stainless steel or carbon steel wire can be used. As will be recognized by those of ordinary skill in the art, these and other modifications can be made to the lock-pin 200 without departing from the spirit or scope of the present invention.

Figure 4:
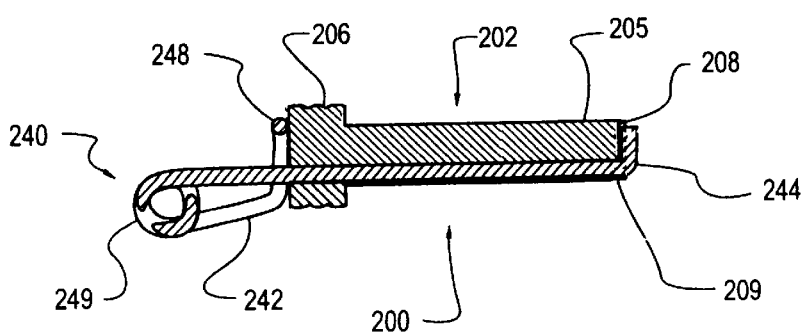
FIG. 4 is a side cross-sectional view of the lock-pin of FIG. 2 taken substantially along line 4—4 of FIG. 2.

FIG. 4 is a side cross-sectional view of the lock-pin 200 taken substantially along line 4—4 of FIG. 2 in accordance with an embodiment of the invention. In one aspect of this embodiment, the spring portion 242 of the key 240 has a stopper portion 248 that bears against the head portion 206 of the pin 202. The spring portion 242 also includes one or more spring coils 249 that exert a spring-loaded retention force against the head portion 206 that keeps the retainer portion 244 removably received in the first groove 208 or alternatively in the second groove 209. The first groove 208 is shaped and sized such that when then retainer 244 is in the unlocked position (FIG. 2), a sufficient turning force applied to the key 240 will cause the retainer to rotate out of the first groove. The second groove 209 may, in some embodiments, be deeper than the first groove 208, such that when the retainer 244 is in the locked position (FIG. 3), a relatively substantial depression of the key 240 toward the head portion 206 combined with a sufficient turning force is required to rotate the retainer out of the second groove.

One advantage of the lock-pin 200 of the present invention is that it does not require access to the far side of a joint or other installation to be locked, and is therefore useable in blind applications. A further advantage is that the retainer portion 244 provides a substantial locking mechanism that may provide greater retention than the spring-loaded balls of some prior art lock-pins.

FIGS. 5, 6 and 7 collectively illustrate embodiments of a lock-pin 500 that can be used in accordance with the present invention to couple a flexible linkage, such as a chain 570, to a member, such as a clevis 560. FIG. 5 is an isometric view of the lock-pin 500 in a retracted position prior to coupling the chain 570 to the clevis 560. In one aspect of this embodiment, the clevis 560 has a first lug portion 566 offset from a second lug portion 567 defining a space therebetween for receiving a link 571 of the chain 570. A first pin bore 561 extending through the first lug portion 566 is coaxially aligned with a second lug bore 562 extending through the second lug portion 567. The first and second pin bores 561 and 562 are shaped and sized to removably receive the lock pin 500.

In another aspect of this embodiment, the lock-pin 500 includes a pin 502 and a rotatable key 540. The pin 502 includes a head portion 506, a shaft portion 503 having a tip end 505, and an axis of symmetry 510. The pin 502 also includes a straight bore 504 extending through the head portion 506 and the shaft portion 503 in a direction that is at least generally longitudinal. The bore 504, however, is not collinear with the axis of symmetry 510.

In another aspect of this embodiment, the key 540 includes an actuating portion, such as a spring portion 542, a retainer portion 544, and an actuator rod portion 546 extending therebetween rotatably disposed within the bore 504 of the pin 502. The pin 502 and the key 540 of the lock-pin 500 are substantially similar in both form and function to the pin 202 and key 240 of the lock pin 200 described above in accordance with FIGS. 2–4. The lock-pin 500, however, further includes a retainer-ring 550 that acts to keep the lock-pin 500 retained on the first lug portion 566 of the clevis 560 when the lock-pin is in the retracted position as shown in FIG. 5.

FIG. 6 is a side cross-sectional view of the lock-pin 500 taken substantially along line 6—6 of FIG. 5 in accordance with an embodiment of the invention. In one aspect of this embodiment, the retainer-ring 550 is disposed in a circular groove 507 toward the tip end 505 of the pin 502. In one embodiment, the retainer-ring 550 is a conventional circlip or snap-ring which is splayed over the tip end 505 and snapped into the groove 507 to capture the lock-pin 500 on the first lug portion 566 of the clevis 560 after the tip end has been inserted through the first pin bore 561 (FIG. 5). In other embodiments, other suitable elements capable of retention in the groove 507 can be used for the retainer-ring 550. In another aspect of this embodiment, the groove 507 should be offset a distance 552 from the tip end 505 so that the tip end will suitably protrude beyond the second lug portion 567 (FIG. 5) when the lock-pin 500 is fully installed in the clevis 560. Suitable protrusion of the tip end 505 is necessary to provide clearance for the retainer 544 when it is rotated to the locked position. In one embodiment, the distance 552 should at least be greater than the thickness of the second lug portion 567 to meet this criteria.

FIG. 7 is an isometric view of the lock pin 500 coupling the chain 570 to the clevis 560 in accordance with an embodiment of the invention. In the illustrated embodiment, the shaft 502 of the lock-pin 500 has been extended through the first lug bore 561, a link 571 of the chain 570, and the second lug bore 562. The retainer-ring 550 has been shaped and sized so that it is small enough to pass through the link 571, but large enough not to pass through the first or second lug bores 561 and 562. The tip end 505 of the shaft 502 slightly protrudes beyond the second lug portion 567 of the clevis 560, allowing the key 540 to be turned approximately 180 degrees so that the retainer 544 extends at a substantially right angle outboard of the shaft 503 thereby retaining the lock-pin 500 in the clevis 560.

One advantage of the lock-pin 500 is that the retainer-ring 550 enables the lock-pin to be retained with the clevis 560 even when the clevis is not in service. This feature eliminates the possibility of misplacing the lock-pin and having to improvise a replacement when subsequent use of the clevis is desired. This feature also enhances the option of selling a clevis and lock-pin as a complete self-contained matched set.

Figure 8:
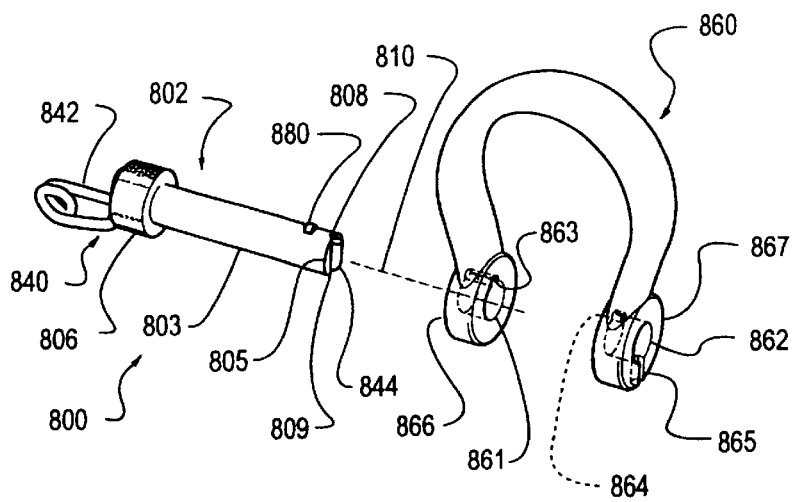
FIG. 8 is an isometric view of a lock-pin and a clevis in accordance with an alternate embodiment of the invention in which the lock-pin is not installed in the clevis.
Figure 9:
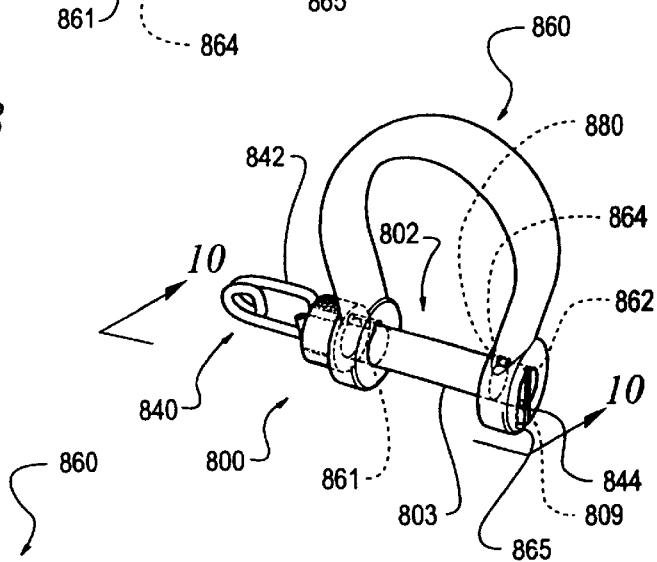
FIG. 9 is an isometric view of the lock-pin and clevis of FIG. 8 in which the lock-pin is installed in the clevis.
Figure 10:
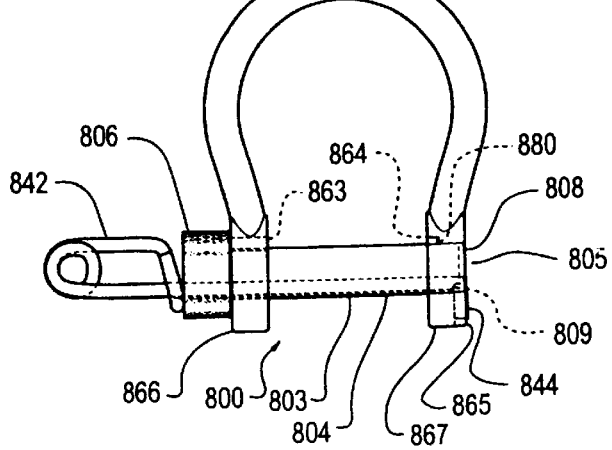
FIG. 10 is a side view of the lock-pin and clevis of FIGS. 8 and 9 taken substantially along line 10—10 of FIG. 9.

FIGS. 8, 9 and 10 collectively illustrate a lock-pin 800 for use with a clevis 860 in accordance with an alternate embodiment of the invention. In the illustrated embodiment of FIGS. 8, 9 and 10, a chain or other structural member (not shown) can be coupled to the clevis 860 with the lock-pin 800. FIG. 8 is an isometric view of the lock-pin 800 prior to installation in the clevis 860. In one aspect of this embodiment, the lock-pin 800 includes a pin 802 and a rotatable key 840. The key 840 includes an actuating portion, such as a spring portion 842, and a retainer portion 844. The pin 802 includes a head portion 806, a shaft portion 803 having a tip end 805, and an axis of symmetry 810. The pin 802 also includes a straight bore 804 extending through the head portion 806 and the shaft portion 803 in a direction that is at least generally longitudinal. The bore 804, however, is not collinear with the axis of symmetry 810. A first groove 808 extends across the tip end 805 in a first direction at a right angle to the bore 804. A second groove 809, that in one embodiment is shorter and deeper than the first groove 808, extends across the tip end 805 in a second direction opposite to the first direction at a right angle to the bore 804.

The pin 802 and key 840 of this embodiment are substantially similar in both form and function as the pin 202 and key 240 of the lock-pin 200 shown in FIGS. 2–4. The lock-pin 800, however, further includes an alignment element 880 that protrudes outward from the shaft portion 803 and rotationally restrains the lock-pin 800 in the clevis 860 when the key 840 is being rotated. In one embodiment, the alignment element 880 is a cylindrical element that protrudes at a right angle from the shaft portion 803. In other embodiments, the alignment element 880 can have other shapes, such as a rectangular shape.

In another aspect of this embodiment, the clevis 860 includes a first lug portion 866 offset from a second lug portion 867 defining a space therebetween. A first pin bore 861 extending through the first lug portion 866 is coaxially aligned with a second pin bore 862 extending through the second lug portion 867. The first lug portion 866 includes an alignment groove 863 shaped and sized such that the alignment element 880 can slidably pass therethrough when the pin 802 is inserted through the first lug portion 866. The second lug portion 867 includes an alignment notch 864 in the inboard side of the second lug portion and a retainer groove 865 in the outboard side of the second lug portion. The alignment notch 864 is shaped and sized to removably receive the alignment element 880 when the pin 802 is inserted into the second lug portion 867. The retainer groove 865 is shaped and sized to removably receive the retainer portion 844 when the key 840 is rotated approximately 180 degrees from the unlocked position to the locked position after the pin 802 has been fully inserted through the second lug portion 867.

FIG. 9 is an isometric view of the lock-pin 800 fully installed in the clevis 860 in accordance with an embodiment of the invention. The pin 802 has been fully inserted through the first pin bore 861 and the second pin bore 862, and the alignment element 880 has been received in the alignment groove 864. Accordingly, the spring portion 842 of the key 840 has been rotated approximately 180 degrees so that the retainer portion 844 extends outboard of the shaft portion 803 and is removably received in the retainer groove 865. One advantage of the lock-pin 800 is that the alignment element 880 automatically locates and retains the lock-pin in the proper registration relative to the clevis 860 so that the second groove 809 will automatically be aligned with the retainer groove 865 to removably receive the retainer portion 844 when the key 840 is rotated into the locked position.

FIG. 10 is a side view of the lock-pin 800 and the clevis 860 taken substantially along line 10—10 of FIG. 9 in accordance with an embodiment of the invention. As can be seen, the alignment groove 863 extends across the full width of the first lug portion 866 to allow the alignment element 880 to pass therethrough. In the illustrated embodiment, the alignment notch 864 does not extend across the full width of the second lug portion 867. In alternate embodiments, however, the alignment notch could extend across the full width of the second lug portion 867. In another aspect of this embodiment, the retainer groove 865 in the second lug portion 867, and the adjacent second groove 809 in the tip end 805 of the shaft portion 803, are both deeper than the first groove 808 in the tip end of the shaft portion. One advantage of making the retainer groove 865 and the second groove 809 deeper than the first groove 808, is that the spring portion 842 must be positively depressed toward the head portion 806 and then rotated to disengage the retainer portion 844 from the retainer groove 865. This feature prevents inadvertent disengagement of the lock-pin 800 from the clevis 860.

Figure 11:
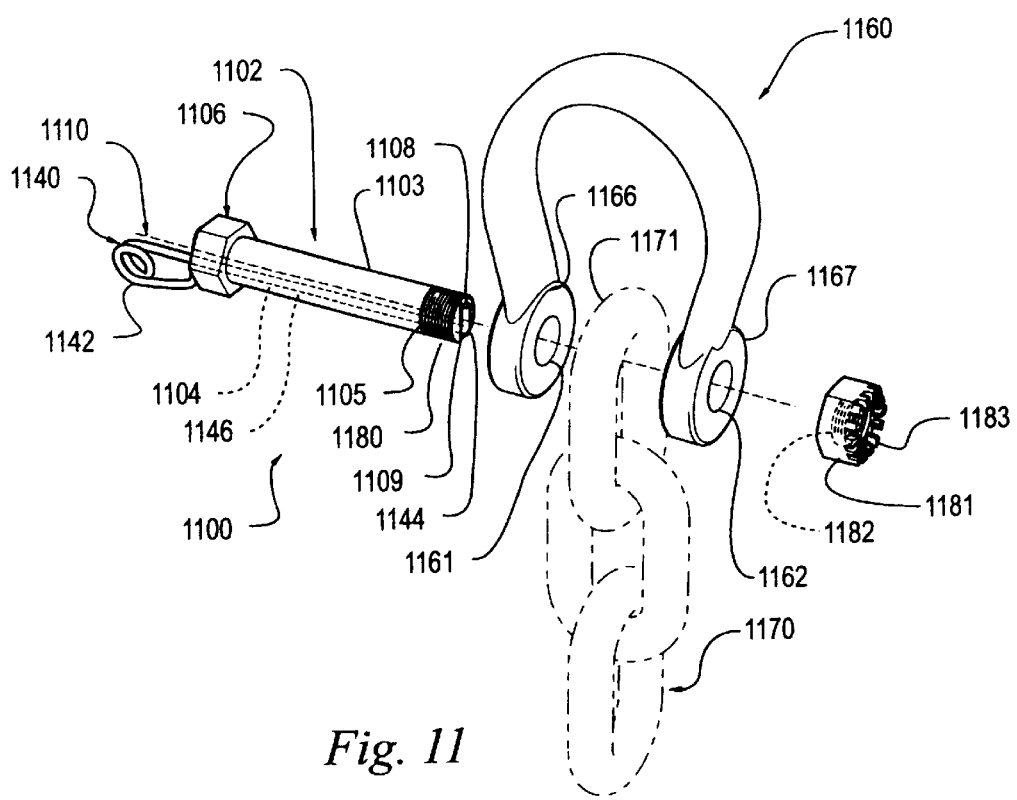
FIG. 11 is an isometric view of a lock-pin, a castellated nut, and a clevis in accordance with an alternate embodiment of the invention useable for coupling a linkage, such as a chain shown in phantom, to the clevis.
Figure 12:
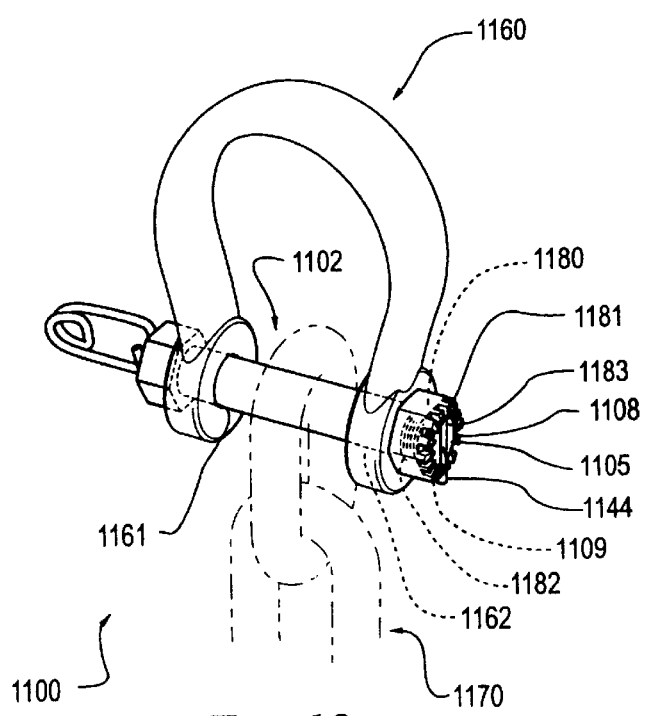
FIG. 12 is an isometric view of the components of FIG. 11 in which the lock pin has been installed in the clevis and threadably engaged with the castellated nut to couple the chain to the clevis in accordance with an alternate embodiment of the invention.

FIGS. 11 and 12 collectively illustrate embodiments of a lock-pin 1100 that can be used in accordance with an alternate embodiment of the invention to couple a flexible linkage, such as a chain 1170, to a member, such as a clevis 1160. FIG. 11 is an isometric view of the lock-pin 1100 prior to installation in the clevis 1160. In one aspect of this embodiment, the clevis 1160 has a first lug portion 1166 offset from a second lug portion 1167 defining a space therebetween for receiving a link 1171 of the chain 1170. A first pin bore 1161 extending through the first lug portion 1166 is coaxially aligned with a second lug bore 1162 extending through the second lug portion 1167. The first and second pin bores 1161 and 1162 are shaped and sized to removably receive the lock pin 1100.

In another aspect of this embodiment, the lock-pin 1100 includes a pin 1102 and a rotatable key 1140. The pin 1102 includes a head portion, such as a hex head 1106, a shaft portion 1103 having a tip end 1105, and an axis of symmetry 1110. The pin 1102 also includes a straight bore 1104 extending through the head portion 1106 and the shaft portion 1103 in a direction that is at least generally longitudinal. The bore 1104, however, is not collinear with the axis of symmetry 1110. A first groove 1108 extends across the tip end 11 05 in a first direction at a right angle to the bore 1104. A second groove 1109, that in one embodiment is shorter and deeper than the first groove 1108, extends across the tip end 1105 in a second direction opposite to the first direction at a right angle to the bore 1104.

In another aspect of this embodiment, the key 1140 includes a spring portion 1142, a retainer portion 1144, and an actuator rod portion 1146 extending therebetween that is rotatably disposed within the bore 1104 of the pin 1102. The pin 1102 and the key 1140 of the lock-pin 1100 are substantially similar in both form and function to the pin 202 and key 240 of the lock pin 200 described above in accordance with FIGS. 2–4. Unlike the lock-pin 200, however, the pin 1102 includes an externally threaded portion 1180 toward the tip end 1105. An engageable member, for example, an internally threaded member such as a castellated hex nut 1181 having internal threads 1182 and castellations 1183, is configured to threadably receive the threaded portion 1180 of the pin 1102.

FIG. 12 is an isometric view of the lock-pin 1100 coupling the chain 1170 to the clevis 1160 in accordance with an embodiment of the invention. The pin 1102 has been fully inserted through the first pin bore 1161 and the second pin bore 1162, and the castellated hex nut 1181 has been threaded onto the threaded portion 1180 of the pin 1102 so that the top of the castellations 1183 are at least approximately flush with the tip end 1105 of the pin. Accordingly, a conventional wrench can be placed on the head portion 1106 to restrain the pin 1102 while the hex nut 1181 is threaded onto the thread portion 1180. The key 1140 is moved to the locked position shown in FIG. 12 by depressing the spring portion 1142 toward the head portion 1106 and turning the spring portion at least approximately 180 degrees. When this is done, the retainer portion 1144 of the key 1140 is rotated out of the first groove 1108 and is removably received by the second groove 1109 and one of the castellations 1183 adjacent to the second groove. When the key 1140 has engaged the castellated hex nut 1181 in the locked position as shown in FIG. 12, it provides a locking feature which prevents the hex nut 1181 from vibrating or otherwise becoming unthreaded from the pin 1102.

FIGS. 13 and 14 are side views of a lock-pin 1300 in a first, or unlocked configuration, and a second, or locked configuration, respectively, in accordance with an alternate embodiment of the invention. Referring to FIG. 13, the lock-pin 1300 includes a cylindrical pin 1302 and a rotatable key 1340. The pin 1302 has a longitudinal axis of symmetry 1310 and a bore 1304 extending through the pin in a direction that is at least generally longitudinal. The bore 1304, however, is not colinear with the longitudinal axis of symmetry 1310. The key 1340 includes a first retainer portion 1344 spaced apart from a second retainer portion 1344 and an actuator rod portion 1346 in the space therebetween. The actuator rod 1346 is rotatably disposed within the bore 1304. The pin 1302 can optionally include grooves or notches 1308 on each end that removably receive the retainer portions 1344 of the key 1340. Although the retainer portions 1344 of the illustrated embodiment are shown as slightly curved elements, it will be apparent to those of ordinary skill in the relevant art that the retainer portions 1344 could also be straight elements.

As best seen on FIG. 14, the lock-pin 1300 is positioned in the locked configuration by rotating the key 1340 at least approximately 180 degrees from the unlocked position shown in FIG. 13. In the locked configuration, the retainer portions 1344 of the key 1340 extend substantially at right angles outboard of the pin 1302. The slight curvature of the retainer portions 1344 act to keep the extended retainer portions from rotating back to the unlocked position. In the locked configuration as illustrated in FIG. 14, the lock-pin 1300 provides a simple means for joining two or more structural members together.

FIG. 15 is an isometric view of the lock-pin 1300 coupling a first link-set 1371 to a second link-set 1373 in accordance with an embodiment of the invention. In this embodiment, the link-sets 1371 and 1373 represent two free ends of a drive chain 1370 that can be connected to form a closed loop chain, such as a typical bicycle drive chain. In other embodiments, lock-pin 1300 can be used to couple other elements together. The first link-set 1371 and the second link-set 1373 each include a left link-plate offset from a right link-plate defining a space therebetween. The second link-set 1373 is disposed in the space between the left and right link-plates of the first link set 1371, and a roller 1374 is disposed in the space between the left and right link-plates of the second link set 1373.

To connect the first link-set 1371 to the second link-set 1373, the lock-pin 1300 is inserted in the unlocked configuration through the two left link-plates, the roller 1374, and the two right link-plates. The key 1340 is then rotated at least approximately 180 degrees such that the retainer portions 1344 extend at substantially right angles outboard of the pin 1302. A groove 1372 can optionally be formed in the outer surfaces of the left and right link-plates of the first link-set 1371 to removably receive the retainer portions 1344 and prevent them from rotating to the unlocked position.

Using the lock-pin 1300 to couple drive chain links together avoids the need to use the special spring clips often provided for this purpose. In addition, the lock-pin 1300 and can easily and readily be installed or removed without any special tools. The bicycle drive chain coupling embodiment of the lock-pin 1300 represents only one of many possible applications for this versatile invention. As will be apparent to those of ordinary skill in the relevant art, the lock-pin 1300 and its derivatives can be used in myriad applications in the recreational, industrial and consumer product arts.

Figure 16:
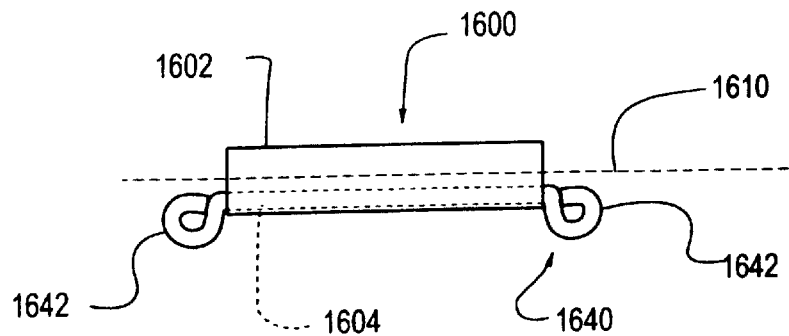
FIG. 16 is a side view of a lock-pin having a rotatable key in accordance with still another embodiment of the invention.

FIG. 16 is a side view of a lock-pin 1600 in accordance with yet another embodiment of the invention. In one aspect of this embodiment, the lock-pin 1600 includes a pin 1602 and a rotatable key 1640. The lock-pin 1600 is substantially similar to the lock-pin 1300 shown in FIG. 13, however, the lock-pin 1600 has eyelet retainer portions 1642. In a locked configuration as shown in FIG. 16, the eyelet retainer portions 1642 extend at substantially right angles outboard of the diameter of the pin 1602.

Figure 17:
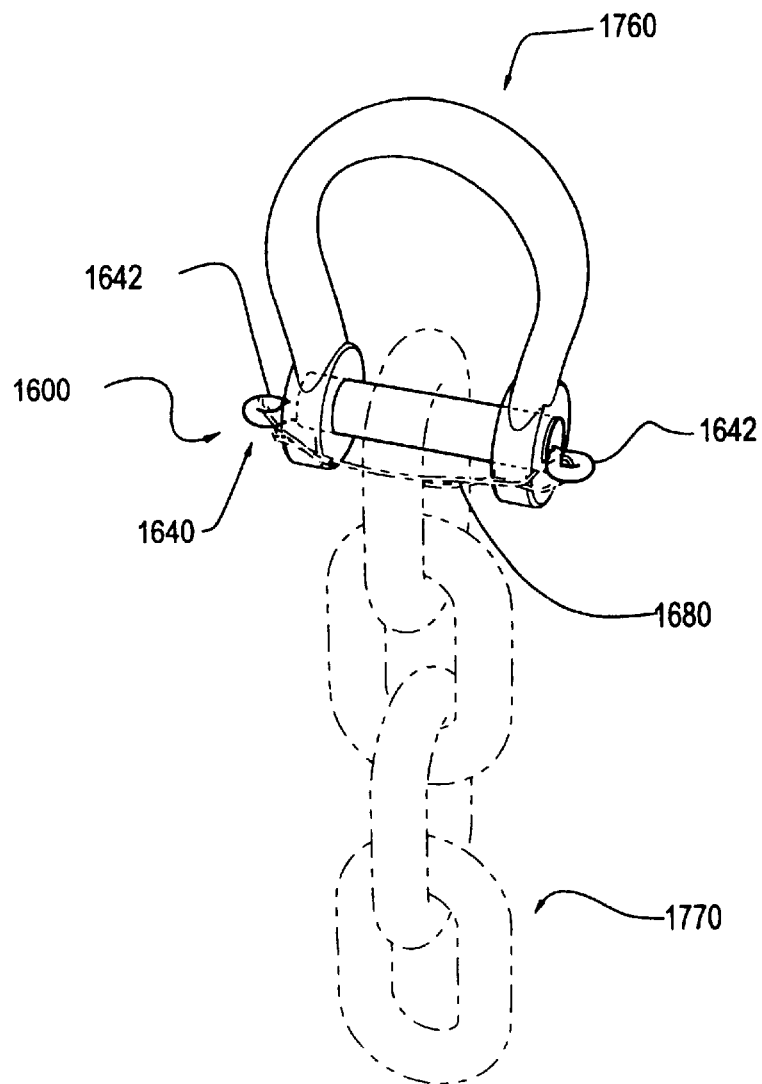
FIG. 17 is an isometric view showing the lock-pin of FIG. 16 coupling a chain shown in phantom to a clevis in accordance with an embodiment of the invention.

FIG. 17 is an isometric view of the lock-pin 1600 coupling a chain 1770 to a clevis 1760 in accordance with an embodiment of the invention. The lock-pin 1600 in the illustrated embodiment functions in a substantially similar manner as the lock-pin 500 shown in FIG. 7, however, a safety element 1680, such as a flexible wire cable, spans between the two eyelet retainer portions 1642. Use of the safety element 1680 adds an added safety feature to the lock-pin 1600 by preventing the lock-pin 1600 from being withdrawn from the clevis member 1760 regardless of the rotational position of the key 1640.

Although all of the lock-pins illustrated in FIGS. 2 through 17 in accordance with the present invention have their bores offset from, and at least approximately parallel to, their axes of symmetry, it will be apparent to those of ordinary skill in the relevant art that the bores could also be skewed relative to the axes of symmetry, and such skewed bores would not significantly alter the function of the disclosed lock-pins. For example, referring back to FIG. 2, as long as the opening of the bore 204 on the tip end 205 of the shaft portion 203 is offset from the center of the tip end, then rotation of the key 240 will result in positioning the retainer portion 244 outboard of the shaft portion. This outboard positioning of the retainer portion 244 provides the locking aspect of the present invention. Accordingly, the present invention is not limited to lock-pins having a bore that is offset from, and parallel to, the axis of symmetry, but instead the present invention extends to all lock-pins having a bore that is not colinear with the axis of symmetry, such as lock-pins having a bore that is skewed relative to the axis of symmetry.

Figure 18:
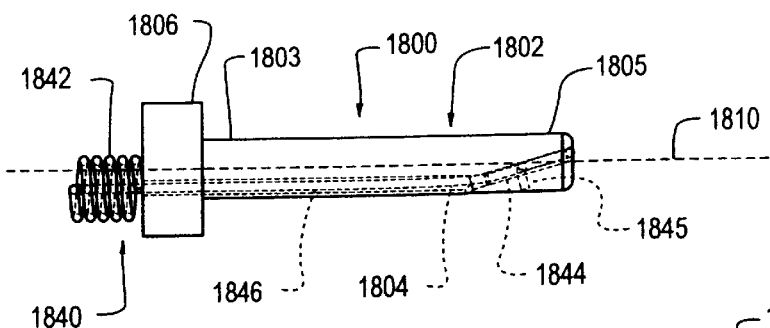
FIG. 18 is a side view of a lock-pin having a pin and a slidable key in accordance with an embodiment of the invention in which the slidable key is slid to a first position.
Figure 19:
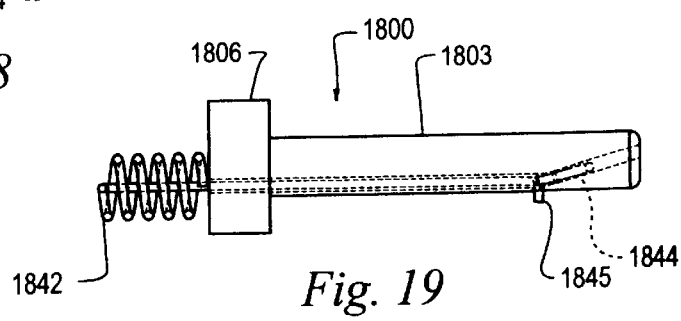
FIG. 19 is a side view of the lock-pin of FIG. 18 in which the slidable key is slid to a second position.

FIGS. 18 and 19 are side views of a lock-pin 1800 in unlocked and locked configurations, respectively, in accordance with an alternate embodiment of the invention. Referring to FIG. 18, in one aspect of this embodiment, the lock-pin 1800 includes a pin 1802 and a slidable key 1840. The pin 1802 includes a head portion 1806, a shaft portion 1803 having a tip end 1805, and a longitudinal axis of symmetry 1810. A bore 1804 extends through the head portion 1806 and partially through the shaft portion 1803 in a generally longitudinal direction that is not colinear with the longitudinal axis of symmetry 1810.

The key 1840 of this embodiment includes a coil spring actuating portion, such as a spring portion 1842, toward the head portion 1806 of the pin 1802, a retainer portion 1844 toward the tip end 1805 of the pin, and an actuator rod portion 1846 extending therebetween. In a further aspect of this embodiment, the key can be made from a resilient metallic wire, such as 0.020 gauge stainless steel or carbon steel wire. In other embodiments, other materials can be used. The actuator rod portion 1846 of the key 1840 is slidably disposed in the bore 1804 of the pin 1802. The retainer portion 1844 includes a catch 1845 that extends at a right angle to the actuator rod portion 1846. In the unlocked position as illustrated in FIG. 18, the spring portion 1842 is depressed against the head portion 1806 such that the catch 1845 is retracted within the shaft portion 1803. As best seen in FIG. 19, as the spring portion 1842 is allowed to expand away from the head portion 1806, the retainer portion 1844 slidably moves toward the head portion 1806 disposing the catch 1845 at a substantially right angle outboard of the shaft portion 1803, thereby placing the lock-pin 1800 in the locked configuration.

Figure 20A:
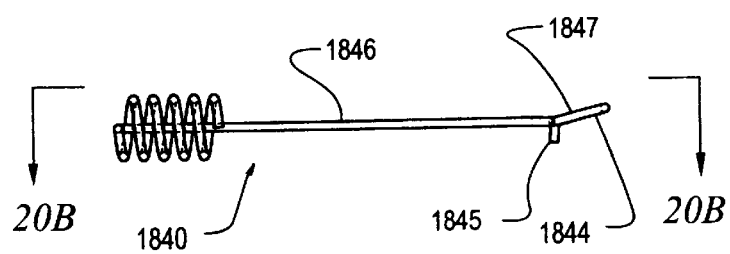
FIG. 20A is a side view of the slidable key of FIGS. 18 and 19.
Figure 20B:
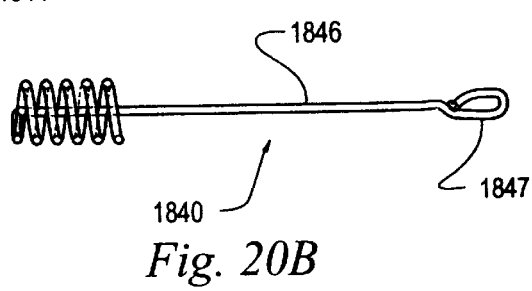
FIG. 20B is a top view of the slidable key of FIG. 20A taken substantially along line 20B—20B of FIG. 20A.

FIGS. 20A and 20B together illustrate aspects of the key 1840 in accordance with an embodiment of the invention. FIG. 20A is a side view of the key 1840 and FIG. 20B is a top view of the key taken substantially along line 20B—20B of FIG. 20A. As shown in FIG. 20A, the retainer portion 1844 of the key 1840 includes a tip portion 1847 disposed at an angle relative to the actuator rod portion 1846. The catch 1845 is positioned at a substantially right angle to the actuator rod portion 1846 at the intersection between the actuator rod portion and the tip portion 1847. As shown in FIG. 20B, the tip portion 1847 of the illustrated embodiment forms a closed loop. In other embodiments, the tip portion 1847 can form other shapes to provide a profile that is wider than the actuator rod portion 1846 to thereby capture the actuator rod portion in the pin 1802 (FIG. 18).

Figure 21:
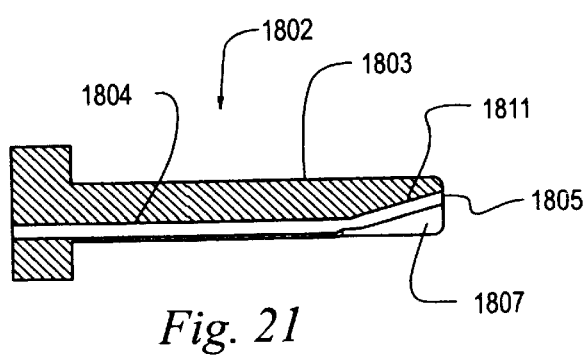
FIG. 21 is a side cross-sectional view of the pin of FIGS. 18 and 19.

FIG. 21 is a side cross-sectional view of the pin 1802 of FIG. 18 in accordance with an embodiment of the invention. In one aspect of this embodiment, the shaft portion 1803 of the pin 1802 includes a groove 1807 extending from the tip end 1805 to at least approximately the end of the bore 1804. When the spring portion 1842 of the key 1840 (not shown) is depressed and released, the catch 1845 slidably travels fore and aft in the groove 1807. In another aspect of this embodiment, the shaft portion 1803 of the pin 1802 further includes a channel 1811 extending from the tip end 1805 to at least approximately the end of the bore 1804. The channel 1811 of the illustrated embodiment is oriented at a right angle to the groove 1807 such that they form a "T" shaped slot in the tip end 1805 of the shaft 1803. When the spring portion 1842 of the key 1840 (not shown) is depressed and released, the tip portion 1847 travels slidably fore and aft in the channel 1811.

Although specific embodiments of lock-pins in accordance with the present invention are described herein for illustrative purposes, various modifications can be made without departing from the spirit and the scope of the invention, as will be recognized by those of skill in the relevant art. Further, the teachings provided herein of the present invention can be applied to other lock-pin devices, and not necessarily the exemplary embodiments described above. These and other changes can be made to the invention in light of the above-detailed description. In general, in the following claims, the terms used should not be construed to limit the invention to the specific embodiments described in this specification and the claims, but should be construed to include all lock-pin devices that operate in accordance with the claims to provide fastening apparatuses and methods of fastening. Accordingly, the invention is not limited by this disclosure, but instead its scope is to be determined entirely by the following claims.

We claim:

1. A look-pin for joining two or more structures, the lock-pin comprising:

a pin having first and second ends, a head portion toward the first end, and a shaft portion extending away from the head portion toward the second end, the pin further having a longitudinal axis and a bore extending through the head portion and the shaft portion in a generally longitudinal direction non-collinear with the longitudinal axis; and a rotatable key having an integral spring portion adjacent to the head portion of the pin, a retainer portion adjacent to the second end of the pin, and an actuator rod portion interconnecting the spring portion to the retainer portion and being at least partially rotatably disposed within the bore of the pin, the spring portion being rotatable to position the retainer portion in a first position wherein the retainer portion is positioned entirely within a projected cross-section of the shaft portion and a second position wherein the retainer portion is at least partially extending outside of the projected cross-section of the shaft portion.

2. The lock-pin of claim 1 wherein the shaft portion is a circular cylinder.

3. The lock-pin of claim 1 wherein the bore is at least approximately parallel to the longitudinal axis.

4. The lock-pin of claim 1 wherein the bore is at least approximately skewed relative to the longitudinal axis.

5. The lock-pin of claim 1 wherein the head portion is at least substantially a circular cylinder and extends at least partially outboard of the shaft portion.

6. The lock-pin of claim 1 wherein the pin is made from a metallic material and the rotatable key is made from a resilient metallic wire material.

7. The lock-pin of claim 1 wherein the rotatable key consists of a single piece of metal.

8. A fastener assembly comprising:

a shaft portion having first and second ends and defining a cross-section dimension, the shaft portion further having a longitudinal axis and a bore extending between the first and second ends in a generally longitudinal direction non-collinear with the longitudinal axis; and a rotatable key having a spring actuating portion urging toward the first end of the shaft portion, a retainer portion adjacent to the second end of the shaft portion, and an actuator rod portion interconnecting the spring actuating portion to the retainer portion and being at least partially rotatably disposed within the bore of the shaft portion, the spring actuating portion being rotatably positionable to rotate the retainer portion to a first position entirely within the cross-section dimension of the shaft portion or to a second position at least partially outside of the cross-section dimension of the shaft portion.

9. The fastener assembly of claim 8 herein the shaft portion has a circular cross-section and the cross-section dimension is a diameter.

10. The fastener assembly of claim 8 wherein the bore is at least approximately parallel to the longitudinal axis.

11. The fastener assembly of claim 8 wherein the bore is at least approximately skewed relative to the longitudinal axis.

12. The fastener assembly of claim 8 further comprising a head portion integrally connected to the first end of the shaft portion, the bore extending at least partially through the head portion, wherein the head portion extends at least partially outboard of the cross-section of the shaft portion.

13. The fastener assembly of claim 12 wherein the head portion is at least substantially a circular cylinder.

14. The fastener assembly of claim 8 wherein the first position of the retainer portion is 180 degrees from the second position of the retainer portion.

15. The fastener assembly of claim 8 wherein the retainer portion is a first retainer portion and the spring actuating portion includes a second retainer portion, the spring actuating portion being rotatably positionable to rotate the first and second retainer portions to the first position entirely within the cross-section dimension of the shaft portion or to the second position at least partially outside of the cross-section dimension of the shaft portion.

16. The fastener assembly of claim 8 wherein the spring actuating portion urges the retainer portion toward the second end of the shaft portion.

17. The fastener assembly of claim 16 wherein the spring actuating portion is compressible toward the first end of the shaft portion, whereby compressing the spring actuating portion toward the first end of the shaft portion causes the retainer portion to move away from the second end of the shaft portion.

18. The fastener assembly of claim 8 further comprising a groove formed in the second end of the shaft portion, the groove being shaped and sized to removably receive at least a portion of the retainer portion when the spring actuating portion is rotated to a selected position.

19. The fastener assembly of claim 8 further comprising a groove formed in the second end of the shaft portion, the groove extending at a right angle away from the bore anti being shaped and sized to removably receive at least a portion of the retainer portion when the spring actuating portion is rotated to a selected position.

20. The fastener assembly of claim 8 further comprising:

a head portion integrally connected to the first end of the shaft portion, the bore extending at least partially through the head portion, the head portion extending at least partially outboard of the cross-section of the shaft portion;

a groove formed in the second end of the shaft portion extending at a right angle away from the bore and shaped and sized to removably receive at least a portion of the retainer portion when the spring actuating portion is rotated to a selected position, wherein the spring actuating portion urges the retainer portion toward the groove, whereby compressing the spring actuating portion toward the head portion causes the retainer portion to move away from the groove.

21. The fastener assembly of claim 8 further comprising:

a head portion integrally connected to the first end of the shaft portion, the bore extending at least partially through the head portion, the head portion extending at least partially outboard of the cross-section of the shaft portion;

a first groove formed in the second end of the shaft portion extending at a right angle away from the bore and shaped and sized to removably receive at least a portion of the retainer portion when the retainer portion is in the first position; and a second groove formed in the second end of the pin extending at a right angle away from the bore and shaped and sized to removably receive at least a portion of the retainer portion when the retainer portion is in the second position, wherein the spring actuating portion urges the retainer portion toward the first and second grooves, whereby compressing the spring actuating portion toward the head portion causes the retainer portion to move away from the first and second grooves.

22. The fastener assembly of claim 21 wherein the first groove extends at a right angle away from the bore in a first direction and the second groove extends at a right angle away from the bore in a second direction opposite to the first direction, and wherein the second groove is deeper than the first groove.

23. The fastener assembly of claim 21 wherein the spring actuating portion includes one or more spring coils and a stopper portion that bears against the head portion, the spring coils cawing the stopper portion to exert a spring force against the head portion that urges the retainer portion against the first groove when the retainer portion is in the first position or alternatively against the second groove when the retainer portion is in the second position.

24. The fastener assembly of claim 21 wherein the retainer portion is a substantially straight cylindrical member projecting at a substantially right angle from the actuator rod portion, wherein the spring actuating portion further includes one or more spring coils and a stopper portion that bears against the head portion, the spring coils causing the stopper portion to exert a spring force against the head portion that urges the retainer portion against the first groove when the retainer portion is in the first position or alternatively against the second groove when the retainer portion is in the second position.

25. The fastener assembly of claim 8 further comprising an engageable member configured to removably engage the second end of the shaft portion, wherein the retainer portion permits the engageable member to disengage from the shaft portion when the retainer portion is in the first position, and wherein the retainer portion prevents the engageable member from disengaging from the shaft portion when the retainer portion is in the second position.

26. The fastener assembly of claim 25 wherein the second end of the shaft portion includes external threads and the engageable member is a nut having complimentary internal treads configured to threadably engage the external threads of the second end of the shaft portion.

27. The fastener assembly of claim 25 wherein the second end of the shaft portion includes external threads and the engage able member is a castellated nut having complimentary internal threads configured to threadably engage the external threads of the second end of the shaft portion, the castellated nut further including castellations configured to removably receive at least a portion of the retainer portion when the retainer portion is in the second position.

28. The fastener assembly of claim 8 further comprising a clevis having a first lug portion space apart from a second lug portion defining a space therebetween, the first lug portion having a first lug bore and the second lug portion having a second lug bore in axial alignment with the first lug bore, the first and second lug bores configured to removably receive separate portions of the shaft portion, the shaft portion thereby spanning the space between the first end second lug portions.

29. The fastener assembly of claim 8 further comprising:
an engageable member configured to removably engage the second end of the shaft portion, wherein the retainer portion permits the engageable member to disengage from the second end of the shaft portion when the retainer portion is in the first position, and wherein the retainer portion prevents the engageable member from disengaging from the second end of the shaft portion when the retainer portion is in the second position; and
a clevis having a first lug portion space apart from a second lug portion defining a space therebetween, the first lug portion having a first lug bore and the second lug portion having a second lug bore in axial alignment with the first lug bore, the first and second lug bores configured to removably receive separate portions of the shaft portion, the shaft portion thereby spanning the space between the first and second lug portions.

30. A method for joining a first structure having a first hole to a second structure having a second hole, the method comprising:

providing a lock-pin, the lock-pin including a shaft portion having first and second ends and defining a cross-section dimension, the shaft portion further having a longitudinal axis and a bore extending between the first and second ends in a generally longitudinal direction non-collinear with the longitudinal axis, the lock-pin further including a rotatable key having a spring actuating portion urging toward the first end of the shaft portion, a retainer portion adjacent to the second end of the shaft portion, and an actuator rod portion interconnecting the spring actuating portion to the retainer portion and being at least partially rotatably disposed within the bore of the shaft portion, the spring actuating portion being rotatably positionable to rotate the retainer portion to a first position entirely within the cross-section dimension of the shaft portion or to a second position at least partially outside of the cross-section dimension of the shaft portion;

axially aligning the first hole in the first structure with the second hole in the second structure;

inserting the shaft portion through the axially aligned first and second holes when the retainer portion is in the first position; and rotating the spring actuating portion to rotate the retainer portion to the second position.

31. The method of claim 30 further comprising depressing the spring actuating portion toward the first end of the shaft portion to move the retainer portion away from the second end of the shaft portion.

32. The method of claim 30 wherein rotating the spring actuating portion to rotate the retainer portion to the second position includes rotating the spring actuating portion through about 180 degrees.

33. The method of claim 30 further comprising:
providing an engageable member configured to removably engage the second end of the shaft portion, wherein the retainer portion permits the engageable member to disengage from the shaft portion when the retainer portion is m the first position, and wherein the retainer portion prevents the engageable member from disengaging from the shaft portion when the retainer portion is in the second position; and
removably engaging the engaging member with the second end of the shaft portion.

34. A lock-pin for joining two or more structures, the lock-pin comprising:
a pin having first and second ends, a head portion toward the first end, and a shaft portion extending away from the head portion toward the second end, the pin further having a longitudinal axis of symmetry and a passage extending through the head portion and the shaft portion in a generally longitudinal direction non-collinear with the longitudinal axis of symmetry; and
a rotatable key having an integral spring portion adjacent to the head portion of the pin, a retainer portion adjacent to the second end of the pin, and an actuator rod portion interconnecting the spring portion to the retainer portion and being at least partially rotatably disposed within the passage of the pin, the spring portion being rotatable to position the retainer portion in a first position wherein the retainer portion is positioned entirely within a projected cross-section of the shaft portion and a second position wherein the retainer portion is at least partially extending outside of the projected cross-section of the shaft portion.

35. The lock-pin of claim 34 wherein the shaft portion is a circular cylinder.

36. The lock-pin of claim 34 wherein the passage is at least approximately parallel to the longitudinal axis.

37. The lock-pin of claim 34 wherein the passage is at least approximately skewed relative to the longitudinal axis.

38. The lock-pin of claim 34 wherein the passage is a bore.

39. A method for joining a first structure having a first hole to a second structure having a second hole, the method comprising:

providing a lock-pin, the lock-pin including a shaft portion having first and second ends and defining a cross-section dimension, the shaft portion further having a longitudinal axis and a passage extending between the first and second ends in a generally longitudinal direction non-collinear with the longitudinal axis, the lock-pin further including a rotatable key having a spring actuating portion urging toward the first end of the shaft portion, a retainer portion adjacent to the second end of the shaft portion, and an actuator rod portion interconnecting the spring actuating portion to the retainer portion and being at least partially rotatably disposed within the passage of the shaft portion, the spring actuating portion being rotatably positionable to rotate the retainer portion to a first position entirely within the cross-section dimension of the shaft portion or to a second position at least partially outside of the cross-section dimension of the shaft portion;

axially aligning the first hole in the first structure with the second hole in the second structure;

inserting the shaft portion through the axially aligned first and second boles when the retainer portion is in the first position, and rotating the spring actuating portion to rotate the retainer portion to the second position.

\* \* \* \* \*